United States Patent [19]
Richardson et al.

[11] 3,920,566
[45] Nov. 18, 1975

[54] SELF-NEUTRALIZING WELL ACIDIZING

[75] Inventors: Edwin A. Richardson, Houston; Ronald F. Scheuerman, Bellaire, both of Tex.

[73] Assignee: Shell Oil Company, Houston, Tex.

[22] Filed: June 20, 1973

[21] Appl. No.: 371,797

Related U.S. Application Data

[63] Continuation-in-part of Ser. No. 274,778, July 24, 1972, Pat. No. 3,826,312.

[52] U.S. Cl. ............................ 252/8.55 C; 166/307
[51] Int. Cl.² ........................................ E21B 43/27
[58] Field of Search ............ 166/270, 271, 300, 307, 166/312, 281, 304; 252/8.55 C, 142

[56] References Cited
UNITED STATES PATENTS

| | | |
|---|---|---|
| 2,094,479 | 9/1937 | Vandergrift et al. ........... 252/8.55 X |
| 2,152,306 | 3/1939 | Grebe et al. ........................ 252/8.55 |
| 2,175,095 | 10/1939 | Stoesser ............................ 166/307 |
| 2,250,379 | 7/1941 | Johnson ............................. 252/142 |
| 3,106,929 | 10/1963 | Friedrich ........................ 252/142 X |
| 3,122,204 | 2/1964 | Oakes ............................. 252/8.55 X |
| 3,600,321 | 8/1971 | Tedeschi et al. ............... 252/8.55 X |
| 3,669,902 | 6/1972 | Hirner ............................ 252/8.55 X |

*Primary Examiner*—Herbert B. Guynn

[57] ABSTRACT

A self-neutralizing aqueous acid comprising an aqueous solution of an acid and at least one pH-increasing material that reacts with water at a selected rate to yield ammonia or an amine to increase the pH of the solution to a selected value.

2 Claims, 3 Drawing Figures

SELF-NEUTRALIZING WELL ACIDIZING

RELATED PATENT APPLICATION

This application is a continuation-in-part of application Ser. No. 274,778, filed July 24, 1972, now U.S. Pat. No. 3,826,312, the disclosure of which is incorporated herein by reference.

BACKGROUND OF THE INVENTION

This invention relates to a self-neutralizing aqueous acid adapted for substantially any use for which an aqueous acid is suitable. More particularly, it relates to an acid that is adapted to be flowed into contact with a material in a remote region in which it is desirable that any of the acid which is not neutralized by the contact with the material, will neutralize itself.

Well acidization is a known and a widely used technique. It is commonly used to increase the permeability of a subterranean reservoir and/or the perforation tunnels extending between a well borehole and a reservoir. It is effected by simply displacing an acidic solution into the region to be acidized.

The well acidizing solutions are usually aqueous solutions of one or more inorganic or organic acids. The most commonly used acids are hydrochloric acid or mixtures of hydrochloric and hydrofluoric acids. Other acids such as acetic, citric, formic, sulfamic, etc., are used, indivually or with hydrochloric or hydrofluoric acids, usually for specialized purposes. The concentrations of well acidizing solutions commonly range from relatively dilute solutions, such as those containing in the order of one-half % by weight of hydrochloric acid to concentrated solutions such as those containing about 30% or more of such an acid.

The conventional acidizing solutions often contain one or more of various additives. Inhibitors are commonly used for reducing the rate of acid attack on tubing strings and other metal equipment in the well. The inhibitors are usually used in amounts of less than about 1 to 2% by weight of the acidizing solutions and commonly comprise compounds of arsenic or copper or water soluble organic compounds containing easily oxidizable groups, such as nitrogen or sulfur containing groups. Interfacial tension lowering surfactants are commonly used to enhance the penetration of an acidizing solution into the pores of the rocks or through films of oil that may cover acid-reactive materials in the region to be acidized. Demulsifying surfactants are commonly used to enhance the breaking or separation of oil-in-water emulsions that tend to be formed by various crude oils when they are contacted by an acidizing solution. Silicate precipitation preventing materials, such as glycols, glycol ethers or the like, are commonly used in the so-called "mud acid" solutions that contain hydrogen fluoride or a material that releases hydrogen fluoride into the solution. Acidization rate retardants, such as water thickening agents, are commonly used to allow a deeper penetration of the solution into a reservoir. Other additives, such as fluid loss control materials, or the like, are also used in relatively special circumstances.

In a U.S. patent filed over 75 years ago, U.S. Pat. No. 556,609, it was disclosed that in an acidization treatment to increase the flow of an oil well, all of the acid may not be neutralized during its reaction with the reservoir rock and, thus, it may be desirable to inject an alkaline liquid behind the acidizing solution in order to complete the neutralization. Various ways of utilizing separate slugs of acidizing solutions and acid neutralizing solutions in conjunction with spacers, gravity differences, or the like, in order to improve the control of the location or the extent of the neutralization, or the dissolving of insoluble silicate materials that may be been left by a mud-acid formulations, were suggested in U.S. Pat. such as Nos. 2,001,350; 2,038,956; 2,152,306; 2,161,085, etc. The inhomogeneities in subterranean regions and the tendencies of different fluids to flow into different portions or differently sized pores of such regions make it difficult and often impossible to ensure that a first injected fluid is ever thoroughly mixed with a second injected fluid.

SUMMARY OF THE INVENTION

This invention relates to self-neutralizing aqueous acidic solutions that consist essentially of water and at least one dissolved acid and at least one dissolved nitrogen-containing pH-increasing reactant that yields ammonia or an amine. The composition and concentration of the pH-increasing reactant are arranged so that the pH of the solution is increased to a selected value in response to a given duration of exposure to a given temperature.

DESCRIPTION OF THE INVENTION

Figure 1:
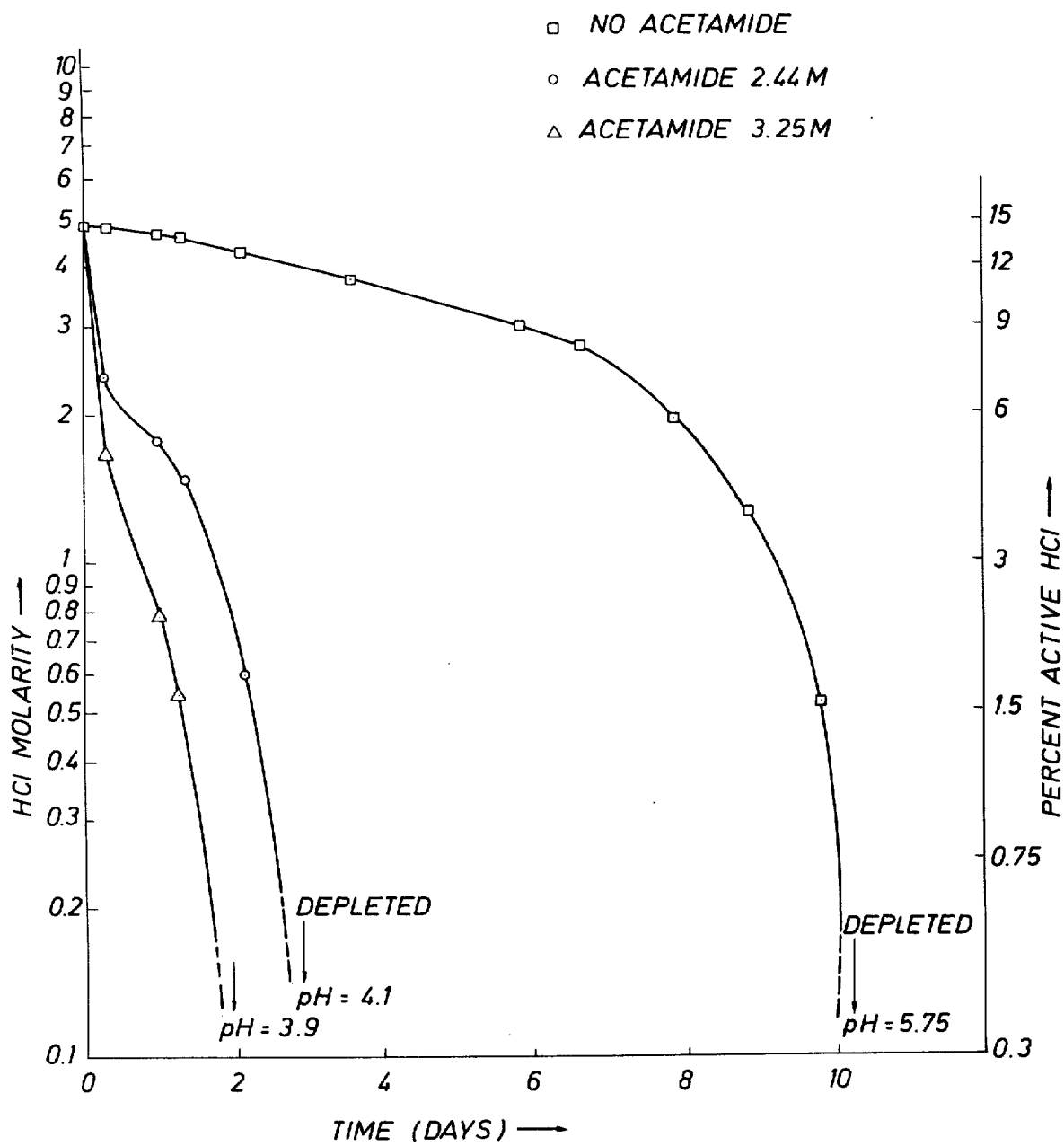
FIG. 1 shows the variation of extent of self-neutralization with time for specific self-neutralizing acid solutions.

The acidic solutions used in the present invention can comprise substantially any aqueous solution of one or more inorganic or organic acids. Such a solution is preferably one that is adapted to react with and dissolve material encountered in a subterranean region in and around the borehole of a well. Such a solution can be formed from earth formation acidizing solutions which are commercially available, e.g., from well treating service companies, including acidizing solutions containing substantially any of the conventionally used additives.

In general, a pH-increasing reactant suitable for use in this invention is substantially any water soluble nitrogen-containing compound or mixture which reacts within an aqueous solution to produce ammonia or a water-soluble amino-group-containing reaction product that increases the pH of the solution by neutralizing or spending the acidity of the solution by the formation of ammonium ions or amine salts. Suitable pH-increasing reactant materials include water-soluble amides or carbamic acid, such as ammonium carbamate and its nitrogen-substituted homologues; urea, the nitrogen-substituted homologues of urea; the addition products of ammonia or amines with formaldehyde, such as tetramethylene tetramine; the amides of carboxylic acids, such as formamide, dimethylformamide, acetamide, etc.; or the like.

In a preferred procedure for using the compositions of the present invention, an acidizing solution, such as one which is commercially avaialable from a service company, is selected or compounded to have a concentration and rate of reaction suitable for the temperature and purpose of a particular acidization treatment of a material in a remote region into which a fluid can be pumped. The compatibility of the selected acidizing solution with at least one pH-increasing reactant is determined. A self-neutralizing acidizing solution of the present invention is formed by dissolving in the selected acidizing solution a pH-increasing reactant which (a) forms ammonia or an amino-group-containing compound (b) is compatible with the acidizing solution components, (c) has a reaction rate that is adapted to delay and/or limit the extent of the self-neutralization of the acidity of the solution long enough to ensure the desired acidization reaction in the remote region, and (d) is dissolved in an amount sufficient to subsequently increase the pH of the solution to a selected value. The desired acidization is effected by pumping the self-neutralizing acidizing solution into the remote region in time to allow the occurrence of the acidization prior to the self-neutralization.

The present invention is particularly useful in preparing a relatively dilute acidizing solution for cleaning or preflushing materials within a subterranean region. Such dilute acids are used for example, in cleaning or preflushing sand or gravel packs and/or the adjacent casing perforations and/or the adjacent reservoir rock in order to ensure a uniform penetration of a fluid, such as a sand consolidating solution of thief zone plugging solution, or the like. In such operations, or in other well acidization treatments in which it may be difficult to estimate how much of the acidity of the acidizing solution will be neutralized in the course of the desired acidization treatment, it is relatively easy to incorporate enough pH-increasing reactant to subsequently provide a pH of from about 2–6 even though none of the acid in the acidizing solution was neutralized by components of the subterranean region.

In general, the concentration of the pH-increasing reactants in the present self-neutralizing acidizing solutions can range from (a) relatively small amounts that are adapted to neutralize only a relatively small but significant proportion of the acidity (for example, as little as about 20%, where the remainder of the acidity will be spent by acid reactive components of a remote region) to (b) more than neutralize all of the acidity (for example, enough to increase the pH above 7, where an alkaline solution is desirable). Increasing amounts of a pH-increasing reactant increase both the rate of neutralization and the extent of neutralization of the acidity.

In the present composition, the presence of a nitrogen-containing (and/or producing) pH-increasing reactant that yields ammonia or an amine tends to retard the corrosion of metal conduits, etc. Such a material increases the inhibition provided by the conventional type of corrosion inhibitors and/or provides a corrosion inhibition in the absence of a conventional inhibitor. In general, where the treatment time is short and/or a high pH is desirable, the amount of pH-increasing reactant, can be substantially as large as is economically feasible (up to and including super-saturated solutions), limited only by the need for all of the acidizing solution components to be dissolved by the time the solution arrives at a fine-pored permeable material, such as a subterranean reservoir being treated.

The present invention provides an aqueous solution in which solutes are interacting so that while the solution is being flowed into a remote region the interacting solutes are adjusting the composition to provide a selected concentration of acid in the solution when it reaches the remote region and are increasing the pH of the solution to a selected value. The aqueous solution initially contains at least one acid and at least one pH-increasing reactant that are dissolved in the solution in proportions that are correlated with the temperature of the remote zone and the travel time of an increment of solution flowing into the zone. The composition of the solution is adjusted by the reaction of the pH-increasing reactant with water and acid to reduce the concentration of acid to the selected value in each increment of the solution. The pH of the solution is maintained at a selected value by forming within each increment of the solution a buffered system having a pH that tends to remain constant with time and/or encounters with acidic or basic materials.

The buffering of the present composition is preferably effected by adjusting the composition of the pH-increasing reactants, for example, to comprise a combination of an amide and a urea (i.e urea or an N-substituted urea). For example, by using different ratios of acetamide and urea, different buffered pH's can be produced and maintained in a given acid solution at a given temperature. Where a 7.5% HCl solution (about 2.4 N hydrochloric acid) contains 1.65 M per liter urea and 1.5 M per liter acetamide and is maintained at a temperature of 168°F, within about 3 days, the solution pH increases (from an initial value of less than 0.1) to about 3. At a pH of 3 the acid is substantially completely spent. It is significantly weaker than a 0.01 N hydrochloric acid, which has a pH of 2. Such a self-neutralizing acid is effectively buffered at a pH of about 4 or 5 (since the equilibrium pH of the solution is about 6).

DELAYED SELF-NEUTRALIZATION

FIG. 1 shows the decrease in extent of acidity with time in various aqueous 15% by weight hydrochloric acid solutions which contain various amounts and types of pH-increasing reactants and are maintained at 168°F. Each of the solutions contains 4.9 moles per liter of urea, one contains an intermediate amount of acetamide (about equivalent to one-half the molarity of the acid) and one contains a larger amount of acetamide (equivalent to about two-thirds the molarity of the hydrochloric acid). At 168°F, these formulations provide self-neutralizing acidizing solutions in which the acidity is essentially completed depleted (to provide a pH of at least about 4) within times ranging from about 2 to about 10 days.

EFFECT OF CONCENTRATION AND TEMPERATURE ON SELF-NEUTRALIZATION TIME

Figure 2:
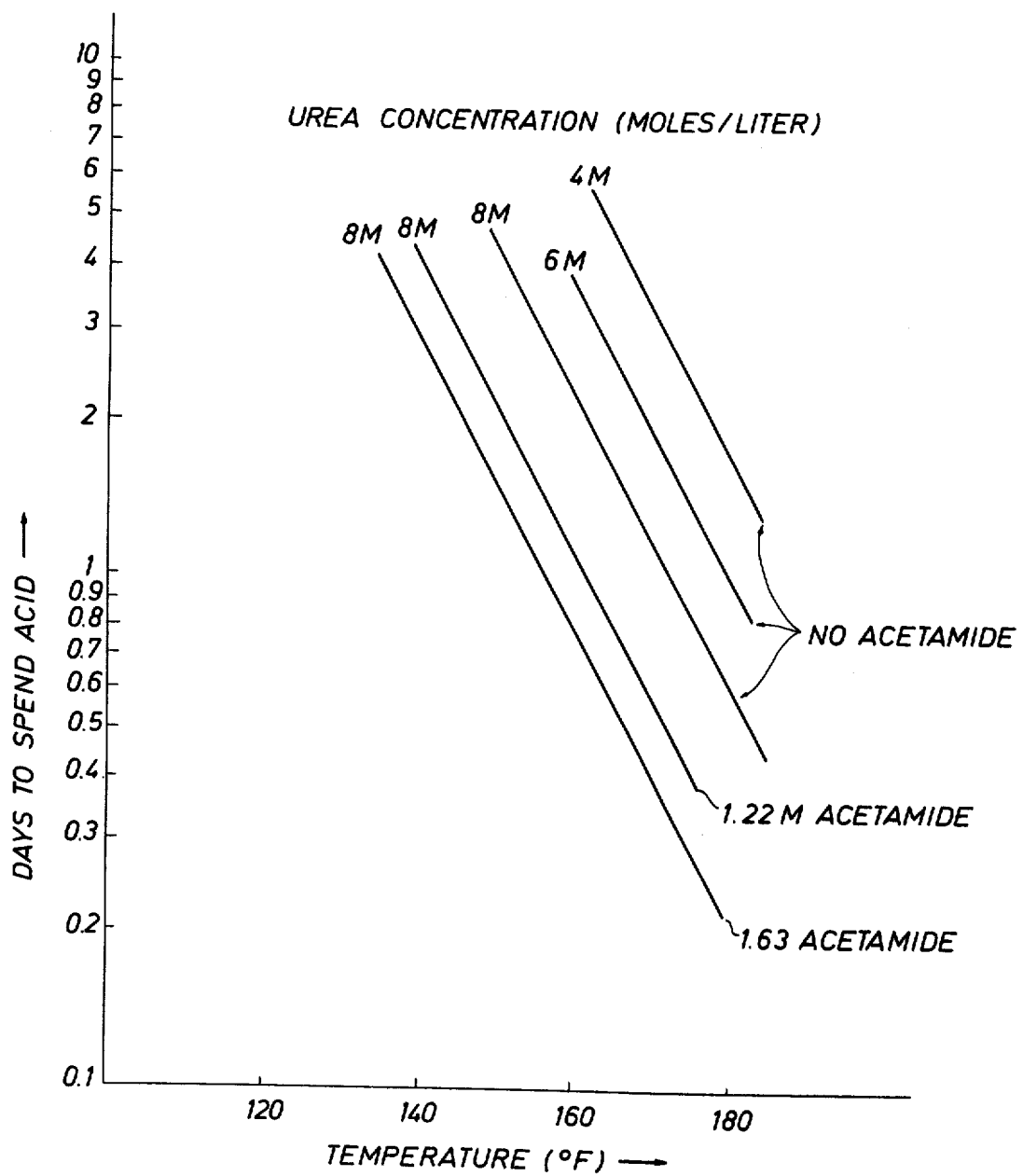
FIG. 2 shows the variation of time required for self-neutralization with temperature for specific self-neutralizing solution.

FIG. 2 shows the decrease of the times required for a series of aqueous solutions (each containing 7.5% by weight hydrochloric acid and the indicated amounts of urea and acetamide) to become self-neutralized at the indicated temperatures. Note that stoichiometric excesses of one or more pH-increasing reactants can be utilized to provide a relatively wide range of self-neutralization times at a relatively wide range of temperatures.

In some situations, such as well acidizing situations, the presence of iron, or the like multivalent metal ions, may be a problem. The acidizing fluid tends to dissolve materials containing such ions but those ions tend to be precipitated, usually as hydroxides, when the acids become spent and the pH of the solutions begin to rise. Ferric hydroxide may begin to precipitate at a pH of 2. In the present process such a precipitation can be avoided by dissolving in the acidizing solution at least one chelating agent that is compatible with the other components of the solution and is effective in forming soluble chelates with the multivalent ions that are apt to be encountered at the temperature and pH that are apt to be present in the self-neutralized spent acid. As known to those skilled in the art, the particular downhole conditions should be considered, for example, in the manner described in the article "Secondary Deposition of Iron Compounds Following Acidizing Treatments" by Smith, Crowe and Nolan, SPE paper 2358, SPE Reg. Mtg. Charleston, W. Va., Nov. 7-8, 1968. Suitable chelating agents include ethylenediaminetetraacetic acid, malonic acid, tartaric acid, citric acid and the like chelating agents.

WELL TREATMENT COMPARATIVE EXAMPLES

Figure 3:
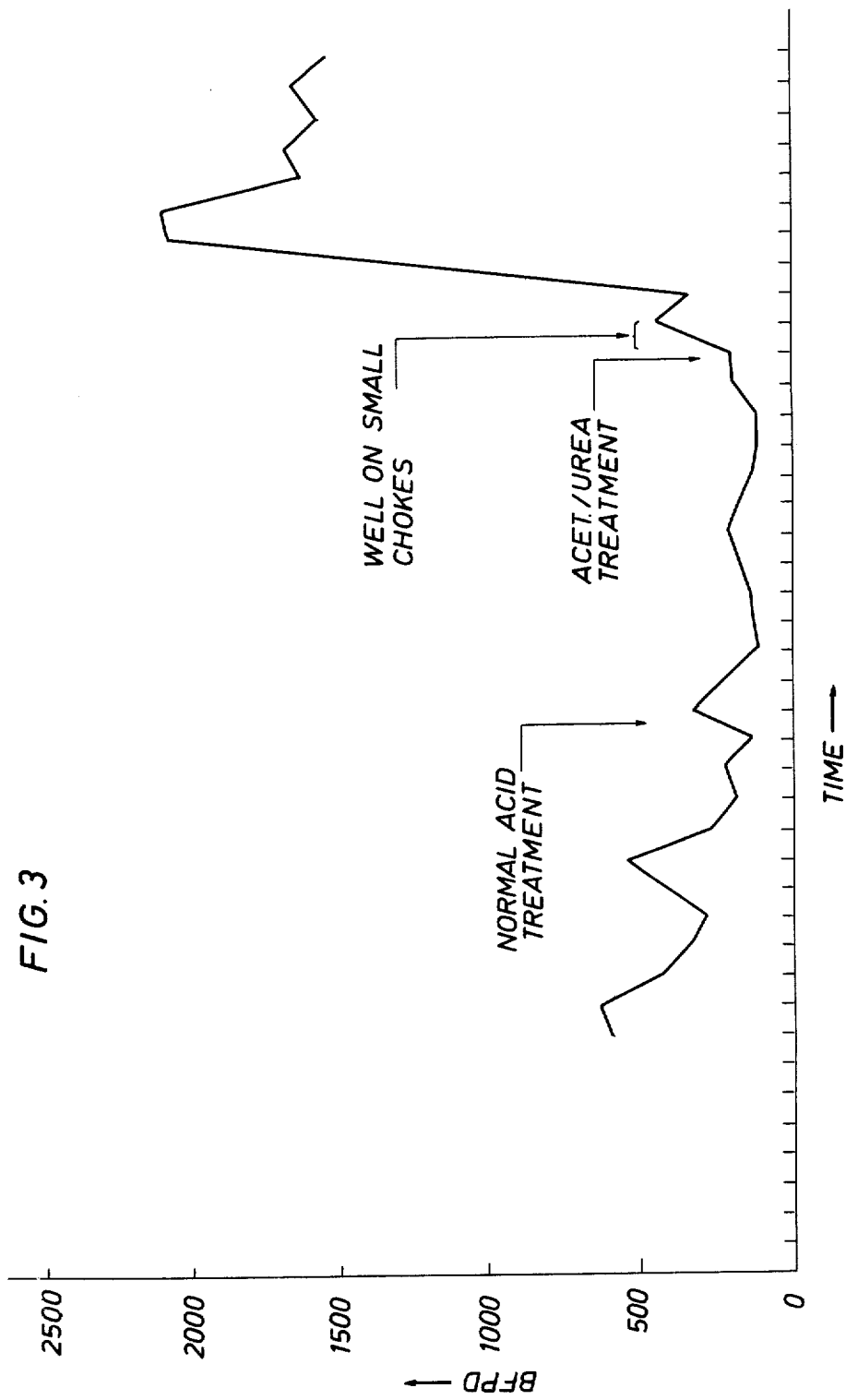
FIG. 3 shows the production history of a well acidized in accordance with a prior process and then with the present process.

FIG. 3 shows the production history in terms of barrels of fluid per day (BFPD) of a well throughout a substantially three-year period. In the second year, the well was acidized by means of a conventional treatment and procedure, using an aqueous mixture of 12% HCl and 2% HF. The acidization caused a typical response, involving a production increase of from about 150 to 350 barrels of fluid per day followed by a decline to about 100 BFPD and a stabilization at about 100 BFPD. In the following year, the well was acidized in accordance with the present invention, using an aqueous solution of 7.5% HCl, 1.5% HF and a proportion of acetamide and urea sufficient to subsequently increase the solution pH to from about 4–6 (respectively, about 1.65 and 1.50 M per liter). The latter treatment, with the self-neutralizing acid, caused an unobviously advantageous increase in production of from about 200 to about 2000 BFPD, the ratio of oil to water in the produced fluid being about 10/90.

Comparisons have been made in the fluids produced from other wells (in the same field as that containing the above well) where some wells have been acidized by prior processes and some with the self-neutralizing acids of the present invention. The fluids produced by back-flowing the wells after acidizations with the self-neutralizing acids were found to be comparatively clear and free of suspended solids (relative to those back-flowed after a conventional acidization). As known to those skilled in the art, such a clarity is indicative of a reduced tendency to suspend fines and/or a tendency to cause less reservoir deterioration.

Samples of such produced fluids were taken from the wellhead manifolds, heater treater oil outlets, and heater treater water outlets. During the production process that were sampled, demulsifier chemicals were added (downstream from the manifold sampling point) at a rate of about 2 quarts per day. Microscopic inspections of the produced fluids failed to show any significant trends in the emulsion characteristics that were uniquely associated with fluids produced after the self-neutralizing acidizations. In addition, the oil-water interfacial tensions in the produced fluid failed to explain the significant differences in clarity. Rigid films were observed in the backflows from both the self-neutralizing and the regular acidizing fluids.

Samples from typical wells A and B in the same field where A was acidized with the present self-neutralizing fluid, and B with a conventional acidizing fluid, were obtained from the backflows, at the indicated substantially-equal times after each of the acidizations. When centrifuged, these fluids each formed an oil-layer, an oil-continuous-emulsion layer, and a free-water layer. It was found that the concentration of resins and asphaltines in the emulsion layer, was from 2–6 times greater than that present in the oil-layer (as indicated in Table 1). In addition, substantial amounts of inorganic salts were found in the oil and emulsion phases of the fluids from both treatments. The solids were found to be about 70% quartz, 10% feldspar and 20% halite. The emulsions appeared to be stabilized by both the organic precipitates and such solids.

It is known that rigid films of asphaltines and resins at an interface between crude oil and water wetted solids cause an apparent wetting of the solids by crude oil. Further, an increase in the pH of the water decreases such an apparent wetting. The strength of the rigid interfacial films around the dispersed phases of such emulsions is known to be stronger in water of acid pH than in a water of neutral pH.

It therefore seems that the treatment of an oil reservoir formation with the present self-neutralizing acid tends to produce emulsions in which the rigid films around the droplets of the dispersed phase are easier to displace (by the addition of an emulsification chemical) than are the rigid films produced by a conventional acidization. And, self-neutralizing acids tend to produce less stable emulsions because of both a decreased oil wetting of the solids and a decreased strength of the organic rigid films.

What is claimed is:

1. A self-neutralizing and buffering acid for being flowed into contact with material in a relatively remote location and subsequently becoming a substantially neutral solution, consisting essentially of:

an aqueous solution containing from about 7.5 to 15 percent hydrochloric acid, from about 0 to 2 percent hydrofluoric acid, and a mixture of urea and at least one amide of the group consisting of formamide, dimethylformamide and acetamide; and a correlation between the composition and concentration of the components of the aqueous solution relative to the temperature and travel time of a solution flowed into the relatively remote location such that the self-neutralization is delayed until the acid has reached said location and such that the pH of the aqueous solution is subsequently increased to from about 4 to 6, even though none of the acid is neutralized by the material contacted in said location.

2. A process for making a self-neutralizing acid that can be flowed into contact with a material in a relatively remote location and subsequently becomes a substantially neutral solution, which process comprises:

compounding an aqueous acid solution consisting essentially of water, from about 7.5 to 15 percent hydrochloric acid, from about 0 to 2 percent hydrofluoric acid, and a mixture of urea and at least one amide of the group consisting of formamide, dimethylformamide and acetamide; and correlating the composition and concentration of the components of the aqueous solution relative to the temperature and travel time of a solution flowed into the relatively remote location so that the self-neutralization is delayed until the fluid reaches said location and the pH of the solution is increased to from about 4 to 6, even though none of the acid is neutralized by the material contacted in said location.

* * * * *